(12) United States Patent
Saito

(10) Patent No.: US 8,812,503 B2
(45) Date of Patent: Aug. 19, 2014

(54) INFORMATION PROCESSING DEVICE, METHOD AND PROGRAM

(75) Inventor: Mari Saito, Kanagawa (JP)

(73) Assignee: Sony Corporation (JP)

( * ) Notice: Subject to any disclaimer, the term of this patent is extended or adjusted under 35 U.S.C. 154(b) by 242 days.

(21) Appl. No.: 12/931,568

(22) Filed: Feb. 4, 2011

(65) Prior Publication Data

US 2011/0202530 A1 Aug. 18, 2011

(30) Foreign Application Priority Data

Feb. 15, 2010 (JP) ................................ P2010-030178

(51) Int. Cl.
*G06F 17/30* (2006.01)
(52) U.S. Cl.
USPC ........................................................ 707/737
(58) Field of Classification Search
USPC .......................................... 707/999.001, 737
See application file for complete search history.

(56) References Cited

U.S. PATENT DOCUMENTS

| | | | |
|---|---|---|---|
| 2004/0163034 A1* | 8/2004 | Colbath et al. | 715/500 |
| 2006/0122842 A1* | 6/2006 | Herberger et al. | 704/278 |
| 2007/0288478 A1* | 12/2007 | DiMaria et al. | 707/10 |
| 2008/0071929 A1* | 3/2008 | Motte et al. | 709/246 |
| 2009/0216692 A1 | 8/2009 | Saito et al. | |
| 2010/0138427 A1* | 6/2010 | Van De Par et al. | 707/748 |

FOREIGN PATENT DOCUMENTS

| JP | 2007-172523 A | 7/2007 |
|---|---|---|
| JP | 2007-207218 A | 8/2007 |

OTHER PUBLICATIONS

Au Yeung et al. "Contextualising Tags in Collaborative Tagging Systems", ACM Jun. 2009.*

* cited by examiner

*Primary Examiner* — Yuk Ting Choi
(74) *Attorney, Agent, or Firm* — Lerner, David, Littenberg, Krumholz & Mentlik, LLP

(57) ABSTRACT

An information processing device includes an obtaining unit that obtains a plurality of contents to which labels indicating users' subjective evaluation of the contents are assigned as metadata, a selection unit that selects labels having a high reliability in regards to evaluation of the contents among the labels assigned to the plurality of contents obtained by the obtaining unit, a calculation unit that calculates a degree of similarity between the labels selected by the selection unit, a clustering unit that clusters the labels based on the degree of similarity calculated by the calculation unit, and a storage unit that stores a cluster obtained as a result of the clustering in the clustering unit, as one label.

7 Claims, 12 Drawing Sheets

FIG. 5

| US | happy |
| DE | gelungen |
| JP | shiawase |
| US | mellow |

} HIGH DEGREE OF SIMILARITY

} HIGH DEGREE OF SIMILARITY

FIG. 6

| | | TEMPO | CORD CHANGE | PERCUSSION | |
|---|---|---|---|---|---|
| US | happy | High | High | Medium | ⎫ HIGH DEGREE OF SIMILARITY |
| DE | gelungen | High | High | High | ⎭ |
| JP | shiawase | Low | Low | Low | ⎫ HIGH DEGREE OF SIMILARITY |
| US | mellow | Low | Medium | Low | ⎭ |

FIG. 7

| DE | aggressiv |
|----|-----------|
| DE | sport |
| JP | ochitsukanai |
| JP | yukanna |
| JP | joggingu |
| US | aggressive |
| US | Sports |

FIG. 9

|  | US | DE | JP |
|---|---|---|---|
| Cluster1 | happy | gelungen |  |
| Cluster2 | angry | dunkel |  |
| Cluster3 | mellow |  | shiawase |
| Cluster4 |  |  | honobono |
| Cluster5 | aggressive sports | aggressiv | ochitsukanai joggingu |

77a

INFORMATION PROCESSING DEVICE, METHOD AND PROGRAM

CROSS-REFERENCE TO RELATED APPLICATION

The present application claims priority from Japanese Patent Application No. JP 2010-030178 filed in the Japanese Patent Office on Feb. 15, 2010, the entire content of which is incorporated herein by reference.

BACKGROUND OF THE INVENTION

1. Field of the Invention

The present invention relates to an information processing device, an information processing method, and a program, and more particularly to an information processing device, an information processing method, and a program capable of accurately assigning sensibility information to given contents of different countries or cultures.

2. Description of the Related Art

In the related art, a desired content can be searched from a large amount of contents by assigning thereto metadata (for example, genre or the like) indicating features of the content.

Particularly, recently, there has been proposed a technique where a content suitable for emotion (mood) of a user is searched and recommended by assigning sensibility information (hereinafter, referred to as a label) to the content as metadata, or the like (for example, see Japanese Unexamined Patent Application Publication No. 2007-172523), or a technique where a content having mood labels corresponding to context (indicating a situation and a state of a user) designated by the user is searched for and recommended (for example, see Japanese Unexamined Patent Application Publication No. 2007-207218).

SUMMARY OF THE INVENTION

However, as candidates for labels capable of being used to search for the above-described content, it is not easy to generally decide which labels to prepare.

Specifically, it is preferable to prepare many candidates which do not overlap (are not similar to) each other; however, to estimate the presence or absence of similarity takes time and effort and thus is troublesome.

Also, regarding contents of different countries or cultures, a content is searched for by translating words indicating labels. For example, when the Japanese word "shiawase" has been assigned as metadata to a piece of music in America, the piece is searched for using the English word "happy" corresponding to the Japanese "shiawase" according to the dictionary.

However, in the music to which "shiawase" is assigned in Japan, the tempo is slow, there are few percussion instruments, and chord progressions are gentle, whereas in the music to which "happy" is assigned in America, the tempo is fast, and there are a large number of percussion instruments. As such, since human sensibility is different in different countries or cultures, it is difficult to accurately search for a desired content through mere translation of the labels.

Therefore, labels may be prepared for each country or cultural sphere in advance and are assigned to the content, but this takes time and effort, and it is difficult to accurately handle labels without understanding the language or culture of the country.

It is desirable to accurately assign sensibility information to given contents of different countries or cultures.

According to an embodiment of the present invention, there is provided an information processing device including an obtaining means that obtains a plurality of contents to which labels indicating users' subjective evaluation of the contents are assigned as metadata; a selection means that selects labels having a high reliability in regards to evaluation of the contents among the labels assigned to the plurality of contents obtained by the obtaining means; a calculation means that calculates a degree of similarity between the labels selected by the selection means; a clustering means that clusters the labels based on the degree of similarity calculated by the calculation means; and a storage means that stores a cluster obtained as a result of the clustering in the clustering means, as one label.

The information processing device may further include a generation means that generates: a cluster discriminator which is a discriminator used to discriminate relevance to the cluster of the contents based on feature values of the contents assigned with the labels which are clustered by the clustering means; and a label discriminator which is a discriminator used to discriminate relevance to the clustered labels of the contents, wherein the storage means may store the cluster as one label when a discrimination accuracy of the cluster discriminator is better than a discrimination accuracy of the label discriminator.

The calculation means may calculate a degree of similarity between the labels selected by the selection means and an existing cluster obtained in advance by the clustering means, and the clustering means may cause the labels to be included in the existing cluster based on the degree of similarity.

The generation means may generate a new cluster discriminator which is a discriminator regarding a new cluster obtained by causing the labels to be included in the existing cluster, and the storage means may store the new cluster as one label when a discrimination accuracy of the new cluster discriminator is better than a discrimination accuracy of the cluster discriminator regarding the existing cluster.

The information processing device may further include an assigning means that, when the labels input used to evaluate contents are included in a cluster which is obtained as a result of the clustering in the clustering means, assigns labels other than the input labels included in the cluster to the contents.

The labels may be given using a plurality of different languages.

According to an embodiment of the present invention, there is provided an information processing method including the steps of obtaining a plurality of contents to which labels indicating users' subjective evaluation of the contents are assigned as metadata; selecting labels having a high reliability in regards to evaluation of the contents among the labels assigned to the plurality of contents obtained at the obtaining step; calculating a degree of similarity between the labels selected at the selection step; clustering the labels based on the degree of similarity calculated at the calculation step; and storing a cluster obtained as a result of the clustering at the clustering step, as one label.

According to an embodiment of the present invention, there is provided a program enabling a computer to perform the steps of obtaining a plurality of contents to which labels indicating users' subjective evaluation of the contents are assigned as metadata; selecting labels having a high reliability in regards to evaluation of the contents among the labels assigned to the plurality of contents obtained at the obtaining step; calculating a degree of similarity between the labels selected at the selection step; clustering the labels based on the degree of similarity calculated at the calculation step; and storing a cluster obtained as a result of the clustering at the clustering step, as one label.

According to an embodiment of the present invention, a plurality of contents, to which labels indicating users' subjective evaluation of the contents are assigned as metadata, is obtained, labels having a high reliability in regards to evaluation of the contents are selected among the labels assigned to the obtained plurality of contents, a degree of similarity between the selected labels is calculated, the labels are clustered based on the calculated degree of similarity, and a cluster obtained as a result of the clustering is stored as one label.

According to an embodiments of the present invention, it is possible to accurately assign sensibility information to given items of different countries or cultures.

BRIEF DESCRIPTION OF THE DRAWINGS

FIG. 5 is a diagram illustrating a process in a similarity calculation unit.

FIG. 6 is a diagram illustrating a process in the similarity calculation unit.

FIG. 7 is a diagram illustrating an example of labels.

FIG. 9 is a diagram illustrating a translation list.

DESCRIPTION OF THE PREFERRED EMBODIMENTS

Figure 1:
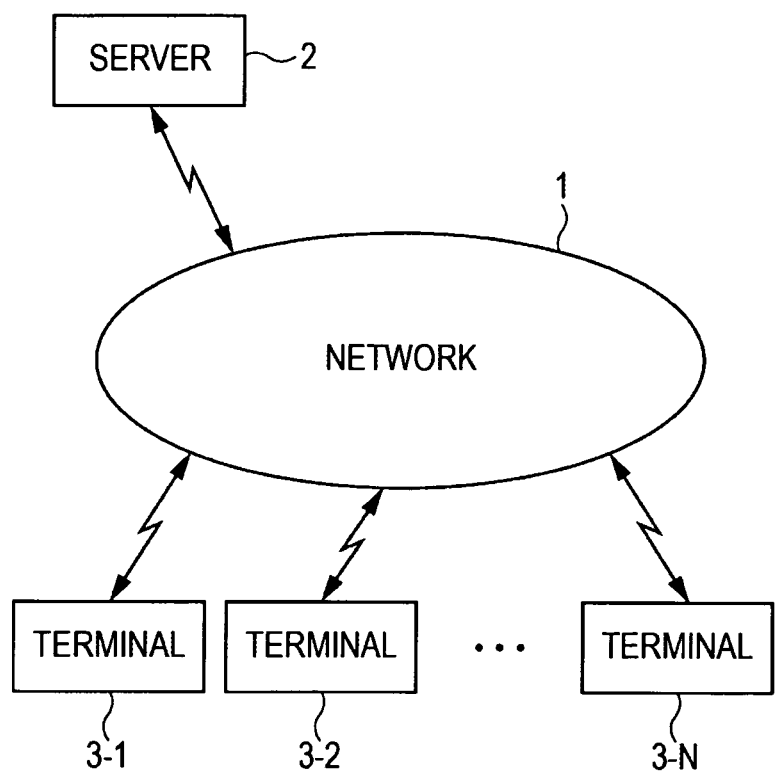
FIG. 1 is a block diagram illustrating a configuration of a system according to an embodiment of the present invention.

Hereinafter, embodiments of the present invention will be described with reference to the accompanying drawings.
Configuration of System FIG. 1 is a diagram illustrating a configuration of a system according to an embodiment of the present invention. A network 1 is connected to a server 2, and terminals 3-1 to 3-N. The system shown in FIG. 1 is a system which presents a given content (for example, music, programs, goods, or the like) searched for by a user to the user. The network 1 includes the Internet or a LAN (Local Area Network) or the like.

The server 2 accumulates a content searched for by a user or assigns thereto information for the user searching for the content. The terminals 3-1 to 3-N are user side terminals. For example, when the user inputs information regarding searching for a content to the terminal 3-1, the content is searched for in the server 2 based on the information and is supplied to the terminal 3-1 via the network 1.

In the following description, in a case where it is not necessary to differentiate between the terminals 3-1 to 3-N, the terminals 3-1 to 3-N are simply referred to as a terminal 3. Although the server 2 is shown singly in FIG. 1, the server 2 may be provided in plurality.

Hardware Configuration of Server

Next, a hardware configuration of the server 2 will be described with reference to FIG. 2.

A CPU (central processing unit) 21 performs various kinds of processes according to programs stored in a ROM (read only memory) 22 or a storage unit 28. A RAM (random access memory) 23 appropriately stores programs or data executed by the CPU 21. The CPU 21, the ROM 22, and the RAM 23 are connected to each other via a bus 24.

The CPU 21 is connected to an input and output interface 25 via the bus 24. The input and output interface 25 is connected to an input unit 26 constituted by a keyboard, a mouse, a microphone, and the like, and an output unit 27 constituted by a display, a speaker, and the like. The CPU 21 performs various kinds of processes in response to commands output from the input unit 26. The CPU 21 outputs processed results to the output unit 27.

The storage unit 28 connected to the input and output interface 25 includes, for example, a hard disc, and stores programs or various kinds of data executed by the CPU 21. A communication unit 29 communicates with an external device (for example, the terminal 3) via the network 1, and thereby receives commands from the external device or outputs information to the external device. In addition, programs may be obtained or stored in the storage unit 28 via the communication unit 29.

A drive 30 connected to the input and output interface 25 drives a magnetic disc, an optical disc, a magnetic optical disc, or a removable medium 31 such as a semiconductor memory, which is installed in the drive 30, and obtains programs or data stored therein. The obtained programs or data is optionally transmitted to and stored in the storage unit 28.

The terminal 3 may be fundamentally configured in the same manner as the server 2, and thus the description thereof will be omitted here.

Functional Configuration of Server

Next, a functional configuration example of the server 2 will be described with reference to FIG. 3.

Figure 2:
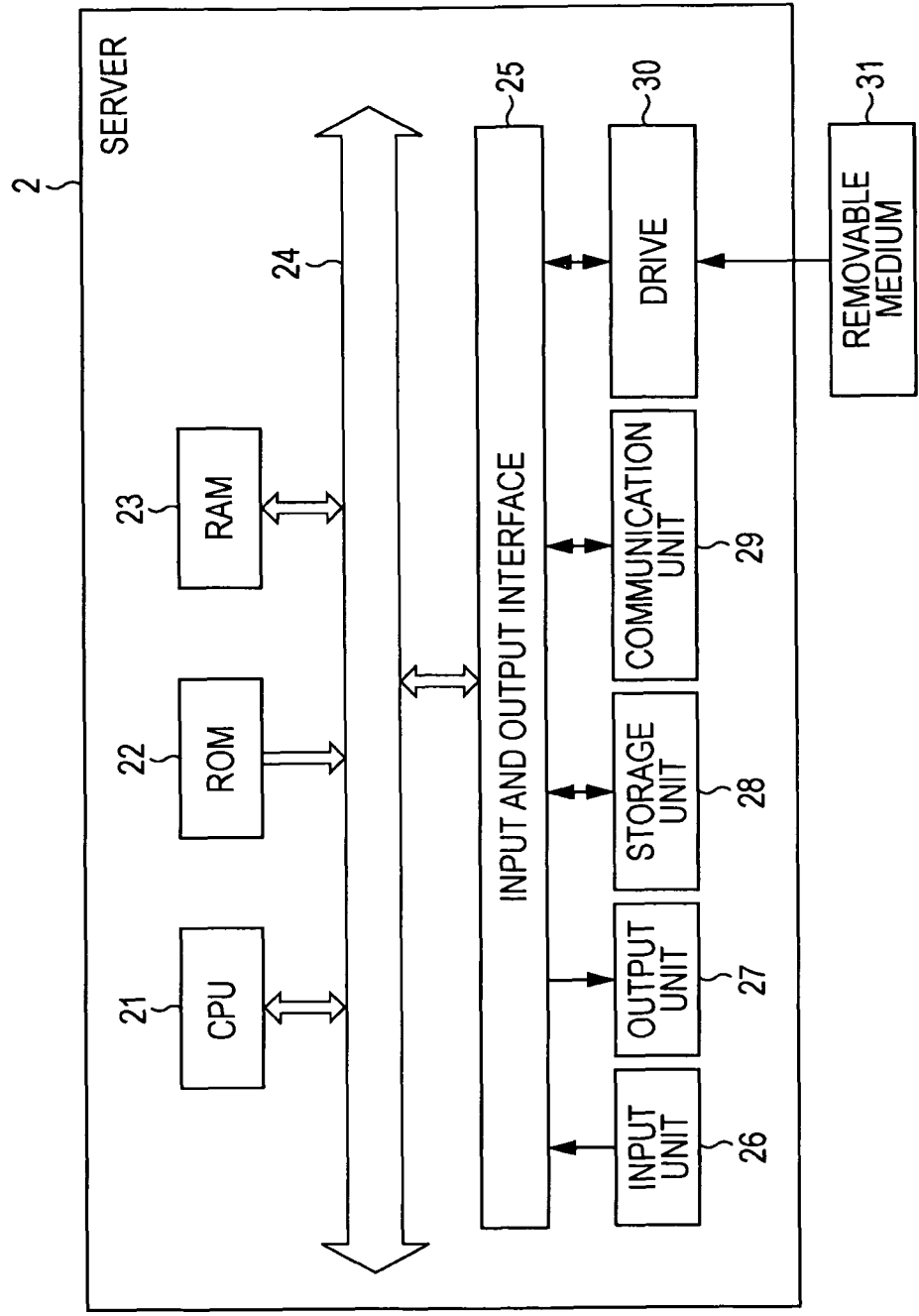
FIG. 2 is a block diagram illustrating a hardware configuration example of a server.
Figure 3:
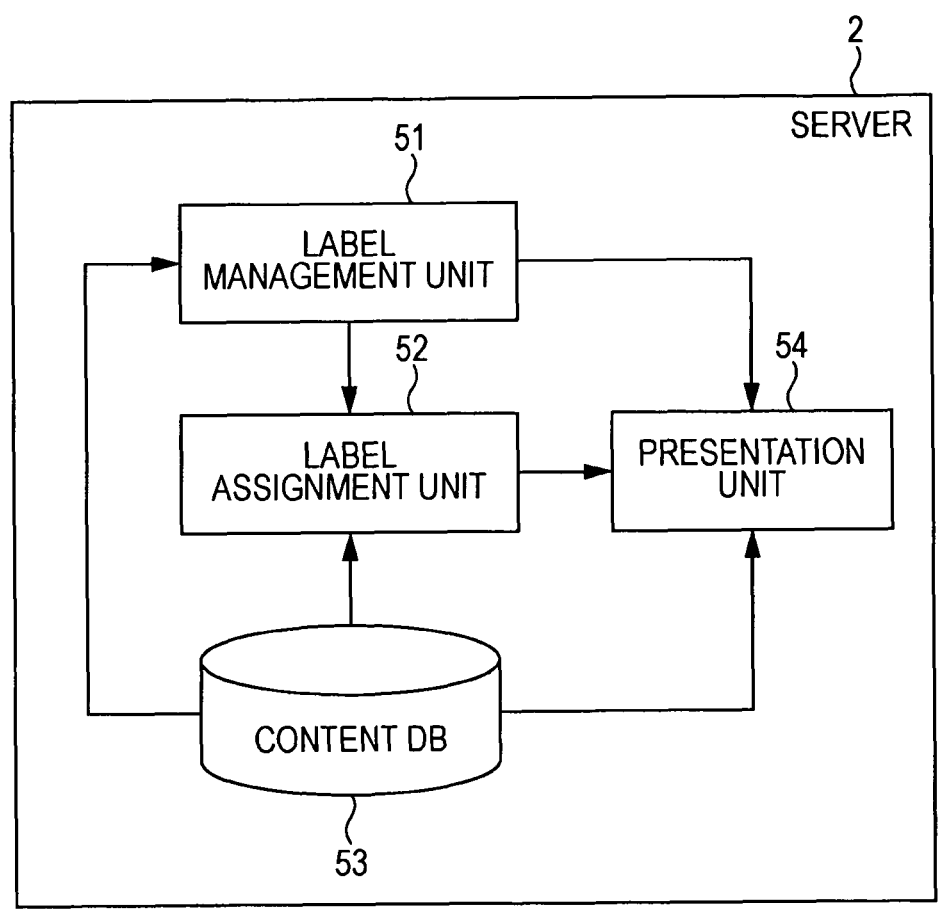
FIG. 3 is a block diagram illustrating a functional configuration example of the server.

The server 2 in FIG. 3 includes a label management unit 51, a label assignment unit 52, a content DB (database) 53, and a presentation unit 54. The label management unit 51 and the label assignment unit 52 are implemented by the CPU 21 (FIG. 2) executing predetermined programs.

The label management unit 51 manages sensibility labels (hereinafter, simply referred to as labels) which are metadata assigned to contents, and optionally supplies the labels to the label assignment unit 52 or the presentation unit 54. Details of the label management unit 51 will be described later.

The label is information indicating users' subjective evaluation (sensibility) of a content. More specifically, the label includes a mood indicating users' emotions for the content, a context indicating users' situations, and activity indicating users' actions.

In response to commands from the terminal 3 by a user, the label assignment unit 52 reads the content stored in the content DB 53 corresponding to the storage unit 28 (FIG. 2), and assigns the labels which are managed in the label management unit 51, to the content. The label assignment unit 52 stores the content to which the labels are assigned in the content DB 53 again or supplies the content to the presentation unit 54.

The presentation unit 54 has functions corresponding to the output unit 27 and the communication unit 29 in FIG. 2. The presentation unit 54 functioning as the output unit 27 displays labels which are read in response to commands from the terminal 3 and are managed in the label management unit 51, or contents accumulated in the content DB 53. The presentation unit 54 functioning as the communication unit 29 supplies labels which are read in response to commands from the terminal 3 and are managed in the label management unit 51 or the content accumulated in the content DB 53, to the terminal 3 via the network 1. The content supplied to the terminal 3 is displayed on an output unit (not shown) (a display or the like) of the terminal 3.

Configuration of Label Management Unit

Figure 4:
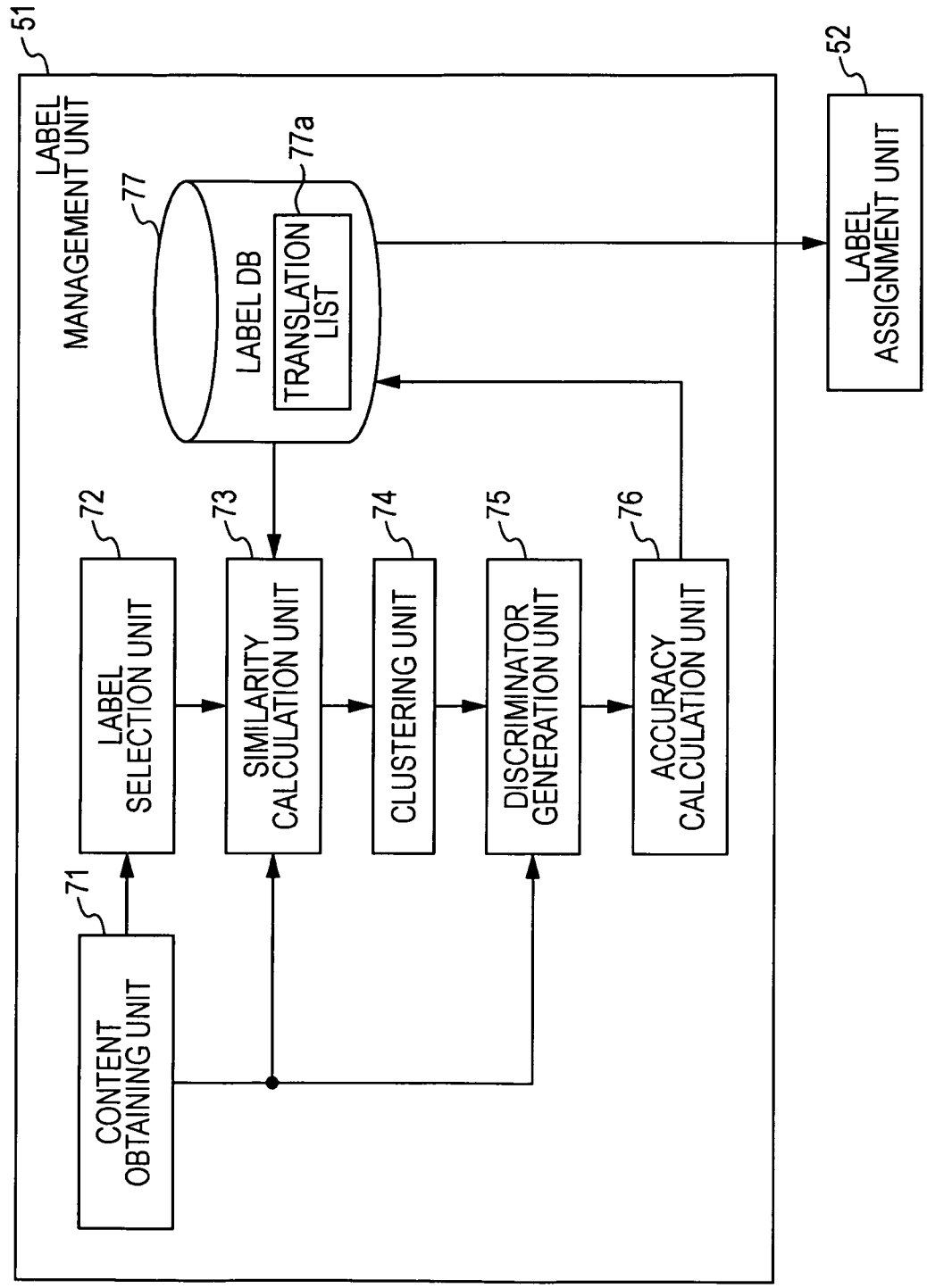
FIG. 4 is a diagram illustrating a configuration example of a label management unit.

A detailed configuration of the label management unit 51 will now be described with reference to FIG. 4.

The label management unit 51 includes a content obtaining unit 71, a label selection unit 72, a similarity calculation unit 73, a clustering unit 74, a discriminator generation unit 75, an accuracy calculation unit 76, and a label DB 77.

The content obtaining unit 71 obtains a predetermined amount of contents from a large amount of contents stored in the content DB 53 (FIG. 3), the terminal 3 on the network 1, or other servers, or the like, and stores the obtained content. For example, when the contents are pieces of music, the content obtaining unit 71 obtains various genres of music pieces (J-POP, rock, classic, enka, and the like).

The content obtained by the content obtaining unit 71 is assigned in advance with labels as metadata by a single user or plural users (volunteers). A number of the labels are prepared without regard to country (language) or culture, and are assigned to the content as evaluation of the content by the volunteers. Specifically, for example, when a certain Japanese person feels "shiawase" after hearing a certain piece of music A, the music A is assigned with a Japanese label "shiawase," and when a certain American feels "happy" after hearing a certain piece of music B, the music B is assigned with an English label "happy."

The labels assigned to the content obtained by the content obtaining unit 71 are assigned to a content accumulated in the content DB 53 of the server 2 or a content on the network 1, according to a request from the terminal 3 by the volunteer.

The content obtained by the content obtaining unit 71 is assigned in advance with physical (objective) feature values (hereinafter, simply referred to as feature values) regarding the content. For example, when the content is music, the tempo of the music, the chord progression, a rise in sound, a keyword extracted from statements regarding the music, and the like are assigned to the music as the feature values.

The label selection unit 72 selects labels having high reliability regarding the evaluation of a content, from the labels assigned to the predetermined amount of contents obtained by the content obtaining unit 71, and supplies the selected labels to the similarity calculation unit 73.

More specifically, for example, the label selection unit 72 selects labels, excluding labels for which the assigned contents are very small, from the labels assigned to the contents obtained by the content obtaining unit 71. Also, for example, when labels are assigned by plural volunteers, the label selection unit 72 selects labels, excluding labels for which there is variation in the tendency (rating) that the labels are assigned by the volunteers (evaluation of contents), from the labels assigned to the contents obtained by the content obtaining unit 71.

The similarity calculation unit 73 calculates the degree of similarity between the respective labels supplied from the label selection unit 72.

For example, the similarity calculation unit 73 calculates the degree of similarity by obtaining a correlation of ratings of the respective labels from the label selection unit 72.

Here, the calculation of the degree of similarity between the labels will be described with reference to FIG. 5.

FIG. 5 shows correlations between labels indicating a mood and codes indicating countries using the labels. More specifically, there are respective correlations between "US" (America) and English "happy," "DE" (Germany) and German "gelungen," "JP" (Japan) and Japanese "shiawase," and "US" (America) and English "mellow." In this way, the labels are assigned to the respective countries (languages) of the world.

According to the similarity calculation unit 73, if a correlation such as, for example, a five-step evaluation or a concordance rate is high between "happy" and "gelungen," the degree of similarity (correlation of ratings) between "happy" and "gelungen" is high. Further, for example, if a correlation such as, for example, a five-step evaluation or a concordance rate is high between "shiawase" and "mellow," a degree of similarity (correlation of ratings) between "shiawase" and "mellow" is high.

The similarity calculation unit 73 may calculate a degree of similarity between the respective labels based on feature values of the content assigned with the respective labels from the label selection unit 72.

Here, the calculation of a degree of similarity between labels based on the feature values of the content assigned with the respective labels will be described with reference to FIG. 6.

In FIG. 6, the same labels as in FIG. 5 are shown, and feature values of the content assigned with the labels are respectively shown on the right part. Also, since the content assigned with the respective labels is not limited to one, it is assumed that the feature values of the content shown in FIG. 6 are obtained by quantifying, averaging, and classifying feature values of the plurality of contents assigned with the labels into three levels of High, Medium and Low.

More specifically, as shown in FIG. 6, the tempo, the chord changes, and the percussion as the feature values of the content assigned with "happy" are High, High, and Medium, respectively. This indicates that the content assigned with "happy" has a tendency to have features in which the tempo is fast, there are many chord changes, and there are slightly more percussion instruments.

In addition, the tempo, the chord changes, and the percussion as the feature values of the content assigned with "gelungen" are High, High, and High, respectively. This indicates that the content assigned with "gelungen" has a tendency to have features in which the tempo is fast, there are many chord changes, and there are many percussion instruments.

Further, the tempo, the chord changes, and the percussion as the feature values of the content assigned with "shiawase" are Low, Low and Low, respectively. This indicates that the content assigned with "shiawase" has a tendency to have features in which the tempo is slow, there are fewer chord change, and there are fewer percussion instruments.

In addition, the tempo, the chord changes, and the percussion as the feature values of the content assigned with "mellow" are Low, Medium, and Low, respectively. This indicates that the content assigned with "mellow" has a tendency to have features in which the tempo is slow, there are more chord changes, and there are fewer percussion instruments.

According to the similarity calculation unit 73, a degree of similarity between the feature values of the content assigned with "happy" and the feature values of the content assigned with "gelungen" is high, and a degree of similarity between the feature values of the content assigned with "shiawase" and the feature values of the content assigned with "mellow" is high.

In this way, the similarity calculation unit 73 calculates degrees of similarity between the respective labels from the label selection unit 72 and supplies the respective labels and information indicating the degrees of similarity to the clustering unit 74.

The similarity calculation unit 73 may calculate a degree of similarity between labels using other methods than the method described above.

Although the calculation of a degree of similarity between the labels indicating a mood has been described in FIGS. 5 and 6, the similarity calculation unit 73 may calculate a degree of similarity between labels indicating context or activity as shown in FIG. 7.

FIG. 7 shows an example of labels indicating context or activity.

FIG. 7 shows that there are correlations between labels indicating context or activity and codes of countries using the labels. More specifically, from the upper part of FIG. 7, sequentially, there are respective correlations between "DE" and German "aggresiv," "DE" and German "sport," "JP" and "ochitsukanai," "JP" and "yukanna," "JP" and "joggingu," "US" and "aggressive," and "US" and "Sports."

The similarity calculation unit 73 may calculate a degree of similarity between labels as shown in FIG. 7, as a correlation of ratings of the respective labels, or calculate a degree of similarity between labels based on feature values of the content assigned with the respective labels.

In addition, the similarity calculation unit 73 calculates not only a degree of similarity between the labels but also a degree of similarity between a cluster in which given labels, accumulated in the label DB 77, are clustered (grouped) and a label obtained separately.

The clustering of labels is described later, and a cluster in which given labels are clustered can be treated in the same manner as an individual label. The similarity calculation unit 73 may calculate a degree of similarity between a label and a cluster, as a correlation of each rating, or calculate a degree of similarity based on feature values of the content assigned with the respective labels.

The similarity calculation unit 73 supplies information indicating the calculated degree of similarity between a label and a cluster to the clustering unit 74 along with the label and the cluster.

The clustering unit 74 clusters the labels based on the labels and the information indicating the degree of similarity from the similarity calculation unit 73, and supplies clusters obtained as a result of the clustering to the discriminator generation unit 75.

For example, the clustering unit 74 designates a pair of labels having a high degree of similarity between the labels from the similarity calculation unit 73, as one cluster. More specifically, the clustering unit 74 designates a pair of "happy" and "gelungen" and a pair of "shiawase" and "mellow" which have a high degree of similarity in FIGS. 5 and 6, as one cluster, respectively. The clustered labels are not limited to the pair (two labels) but may be three or more labels.

The clustering unit 74 receives the information indicating a degree of similarity between a label and a cluster from the similarity calculation unit 73, and if the degree of similarity is larger than a predetermined value, obtains a new cluster by clustering the label, and supplies the obtained cluster to the discriminator generation unit 75.

The discriminator generation unit 75 generates a cluster discriminator which is a discriminator for discriminating between relevance and non-relevance to a cluster of a content through mechanical learning, based on feature values of the content assigned with labels included in the cluster from the clustering unit 74. Also, the discriminator generation unit 75 generates, for each label, a label discriminator which is a discriminator for discriminating between relevance and non-relevance to each label, included in a cluster, of a content through mechanical learning, based on feature values of the content assigned with the labels included in the cluster from the clustering unit 74. The discriminator generation unit 75 supplies the generated discriminators to the accuracy calculation unit 76.

For example, when a cluster constituted by "happy" and "gelungen" is supplied from the clustering unit 74, the discriminator generation unit 75 obtains the feature values of a content which is assigned with "happy" and "gelungen" from the content obtaining unit 71, and generates a cluster discriminator for a cluster constituted by "happy" and "gelungen" and a label discriminator for each label of "happy" and "gelungen."

In addition, for example, when a new cluster constituted by a label and a cluster is supplied from the clustering unit 74, the discriminator generation unit 75 obtains the label and feature values of a content which is assigned with labels included in the cluster from the content obtaining unit 71, and generates (regenerates) a cluster discriminator for a new cluster based on the feature values.

The accuracy calculation unit 76 calculates discrimination accuracy of the discriminators supplied from the discriminator generation unit 75.

More specifically, when the cluster discriminator and the label discriminator for each label included in the cluster are supplied from the discriminator generation unit 75, the accuracy calculation unit 76 obtains and compares discrimination accuracy of the cluster discriminator and discrimination accuracy of the label discriminator for each label. As a result of the comparison, when the discrimination accuracy of the cluster discriminator is high, the accuracy calculation unit 76 supplies the cluster to label DB 77 as one label. On the other hand, when the discrimination accuracy of the label discriminator for each label is high, the accuracy calculation unit 76 supplies each label included in the cluster to the label DB 77.

Here, a detailed example of the process performed in the accuracy calculation unit 76 will be described with reference to FIG. 8.

Figure 8:
FIG. 8 is a diagram illustrating a process in an accuracy calculation unit.

As shown in the left side of FIG. 8, the accuracy calculation unit 76 obtains discrimination accuracy of a label discriminator for each of, for example, three labels ("dark" of "DE," "angry" of "US," and "dark" of "US"). In FIG. 8, the discrimination accuracy of the label discriminator for "dark" of "DE" is 0.62, the discrimination accuracy of the label discriminator for "angry" of "US" is 0.43, and the discrimination accuracy of the label discriminator for "dark" of "US" is 0.39. Also, the accuracy calculation unit 76 obtains an average value Average of 0.48 from the discrimination accuracies of the label discriminators for the three labels.

Further, the accuracy calculation unit 76 obtains discrimination accuracy Cluster of 0.79 of a cluster discriminator for a cluster in which the three labels are clustered, and compares the obtained discrimination accuracy with the average value of the discrimination accuracies of the three label discriminators.

In this case, upon comparison of the average value 0.48 of the discrimination accuracies of the three label discriminators with the discrimination accuracy 0.79 of the cluster discriminator, since the discrimination accuracy 0.79 of the cluster discriminator is larger, the accuracy calculation unit 76 supplies the cluster in which the three labels are clustered to the label DB 77 as one label.

The cluster obtained in this way is constituted by clustered labels based on human sensibility (subjective evaluation) regardless of country (language) or culture.

Also, as shown in the right side of FIG. 8, the accuracy calculation unit 76 obtains a discrimination accuracy of the label discriminator, for example, for each of seven labels shown in FIG. 7. In FIG. 8, the discrimination accuracy of the label discriminator for "aggressin" of "DE" is 0.73, the discrimination accuracy of the label discriminator for "sport" of "DE" is 0.77, the discrimination accuracy of the label discriminator for "ochitsukanai" of "JP" is 0.66, the discrimination accuracy of the label discriminator for "yukanna" of "JP" is 0.69, the discrimination accuracy of the label discriminator for "joggingu" of "JP" is 0.74, the discrimination accuracy of the label discriminator for "aggressive" of "US" is 0.78, and the discrimination accuracy of the label discriminator for "Sports" of "US" is 0.78.Also, the accuracy calculation unit 76 obtains an average value Average of 0.74 from the discrimination accuracies of the label discriminators for the seven labels.

Further, the accuracy calculation unit 76 obtains a discrimination accuracy Cluster of 0.62 of the cluster discriminator for a cluster in which the seven labels are clustered, and compares the obtained discrimination accuracy with the average value of the discrimination accuracies of the seven label discriminators.

In this case, upon comparison of the average value 0.74 of the discrimination accuracies of the seven label discriminators with the discrimination accuracy 0.62 of the cluster discriminator, since the average value 0.74 of the discrimination accuracy of the label discriminators is larger, the accuracy calculation unit 76 supplies each of the seven labels to the label DB 77.

The accuracy of the discriminator obtained by the accuracy calculation unit 76 is stored in a storage unit (not shown) for each discriminator in the accuracy calculation unit 76.

When the regenerated cluster discriminator is supplied from the discriminator generation unit 75, the accuracy calculation unit 76 obtains a discrimination accuracy of the regenerated cluster discriminator, and compares the obtained discrimination accuracy with a discrimination accuracy of the cluster discriminator before being regenerated (stored in the storage unit (not shown)). As a result of the comparison, when the discrimination accuracy of the regenerated cluster discriminator is high, the accuracy calculation unit 76 supplies a new cluster to the label DB 77 as one label. On the other hand, when the discrimination accuracy of the cluster discriminator before being regenerated is high, the accuracy calculation unit 76 supplies the cluster before being clustered to the label DB 77.

The label DB 77 stores the cluster and the labels supplied from the accuracy calculation unit 76. The cluster accumulated (stored) in the label DB 77 is treated in the same manner as the label, is read by the label assignment unit 52, and then is assigned to a given content. On the contrary, labels which are accumulated in the label DB 77 and are not clustered are respectively treated as one cluster. The clusters (labels) accumulated in the label DB 77 are appropriately read by the similarity calculation unit 73 which calculates a degree of similarity between the cluster and a label.

The label DB 77 stores a translation list 77a in which labels formed of languages of countries included in the clusters are respectively correlated with each other.

Here, an example of the translation list 77a will be described with reference to FIG. 9.

As shown in FIG. 9, in the translation list 77a, for five clusters Cluster 1 to Cluster 5, English "US," German "DE," and Japan "JP" labels included in the respective clusters are correlated with each other.

More specifically, as labels included in Cluster 1, English "happy" and German "gelungen" are correlated with each other, and as labels included in Cluster 2, English "angry" and German "dunkel" are correlated with each other. In addition, as labels included in Cluster 3, English "mellow" and Japanese "shiawase" are correlated with each other, and as labels included in Cluster 4, only the Japanese "honobono" is shown. Further, as labels included in Cluster 5, English "aggressive" and "sports," German "aggressin," and Japanese "ochitsukanai" and "joggingu" are correlated with each other.

This translation list 77a is referred to by the label assignment unit 52 when a user assigns a label to a content in the content DB 53 from the terminal 3, or the translation list 77a is referred to by the presentation unit 54 when a content assigned with a label is displayed.

For example, if an American who does not understand German intends to assign a German label corresponding to the English word "happy" as a label for a certain piece of music, during a stay in Germany or the like, according to the translation list 77a in FIG. 9, "gelungen", which is included in the same cluster Cluster 1 as "happy", is assigned to the music.

Also, for example, if a Japanese who does not understand English intends to assign an English label corresponding to the Japanese word "ochitsukanai" as a label for a certain piece of music, during his stay in America, according to the translation list 77a in FIG. 9, "aggressive" included in the same cluster Cluster 5 as "ochitsukanai" is assigned to the music.

Example of Label Clustering Process

Next, a label clustering process performed by the above-described server 2 will be described with reference to a flowchart in FIG. 10.

Figure 10:
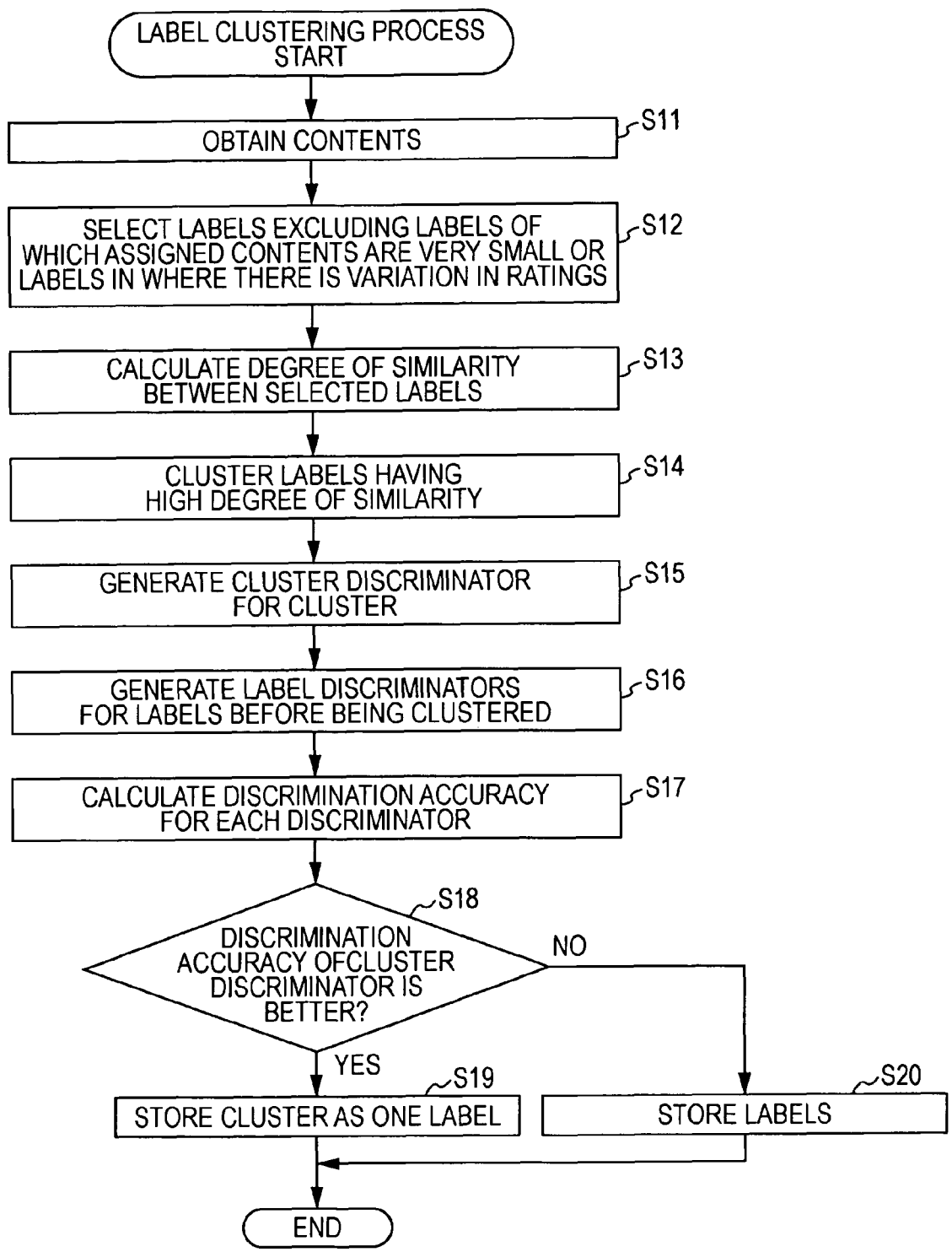
FIG. 10 is a flowchart illustrating an example of a label clustering process.

The label clustering process described with reference to the flowchart in FIG. 10 is performed in an initial state of the server 2 where clusters are not sufficiently accumulated in the label DB 77.

In step S11, the content obtaining unit 71 obtains a predetermined amount of contents from a large amount of contents accumulated in the content DB 53, the terminal 3 on the network 1, or other servers or the like.

In step S12, the label selection unit 72 selects labels excluding labels of which the assigned contents are very small or labels in which there is variation in ratings by volunteers, from the labels assigned to the contents obtained by the content obtaining unit 71, and supplies the selected labels to the similarity calculation unit 73.

In step S13, the similarity calculation unit 73 calculates a degree of similarity between the respective labels supplied from the label selection unit 72 and supplies the respective labels and information indicating the degree of similarity to the clustering unit 74.

In step S14, the clustering unit 74 clusters labels having a high degree of similarity using a method based on a k-means method or a correlation rule, on the basis of the respective labels and the information indicating the degree of similarity from the similarity calculation unit 73, and the clustering unit 74 supplies the obtained cluster to the discriminator generation unit 75. Also, here, when plural clusters can be obtained by clustering labels, processes from step S14 are performed for each cluster together.

In step S15, the discriminator generation unit 75 generates a cluster discriminator for the cluster based on feature values of the content assigned with the labels included in the cluster from the clustering unit 74, and supplies the generated cluster discriminator to the accuracy calculation unit 76.

In step S16, the discriminator generation unit 75 generates a label discriminator for each label before being clustered based on the feature values of the content assigned with the labels included in the cluster from the clustering unit 74, and supplies the generated label discriminators to the accuracy calculation unit 76.

In step S17, the accuracy calculation unit 76 calculates and compares discrimination accuracy of each of the cluster discriminator and the label discriminators from the discriminator generation unit 75. Here, the accuracy calculation unit 76 calculates the appropriate discrimination accuracy, such as an Accuracy or a F value, used for each calculation, by Cross Validation or the like.

In step S18, the accuracy calculation unit 76 determines whether or not the discrimination accuracy of the cluster discriminator is better as a result of the comparison of the discrimination accuracy of the cluster discriminator and the discrimination accuracy of the label discriminators.

When the discrimination accuracy of the cluster discriminator is determined to be better in step S18, the flow goes to step S19, where the accuracy calculation unit 76 supplies the cluster to the label DB 77 as one label so as to be stored.

On the other hand, in step S18, when the discrimination accuracy of the cluster discriminator is determined not to be better, that is, when the discrimination accuracy of the label discriminators is high, the flow goes to step S20, where the accuracy calculation unit 76 supplies each label included in the cluster to the label DB 77 so as to be stored.

By the above-described process, labels of different languages are grouped based on a degree of similarity between labels. Thereby, for example, when a user assigns a label to a given content as evaluation of the content in a country using a language which the user does not completely understand, a label of the country corresponding to the label of the user's own language may be easily selected. Therefore, it is possible to accurately assign sensibility information to given contents of different countries or cultures.

Particularly, when the correlation of the ratings is used in the calculation of a degree of similarity between labels, labels for which a tendency of evaluation of a content by volunteers is close are clustered, and thus it is possible to group the labels from the viewpoint closer to human beings. In other words, since labels indicating similar sensibility can be grouped even in a case of different languages, it is possible to accurately assign sensibility information to given contents of different countries or cultures.

Also, when plural clusters can be obtained in step S14 in the flowchart in FIG. 10, the processes from step S14 are performed for each cluster together; however, there is a case where only one cluster is obtained by clustering a pair of labels having a highest degree of similarity. In this case, the degree of similarity between the cluster in step S19 or the labels stored in step S20 and labels which are not clustered may be secondly calculated, and the processes from step S13 may be repeatedly performed.

As such, the process has been described where the labels are clustered collectively in such an initial state that clusters are not sufficiently accumulated in the label DB 77. Hereinafter, a process in a case where labels are additionally given from a state where a relatively sufficient number of clusters are accumulated will be described.

Another Example of Label Clustering Process

Figure 11:
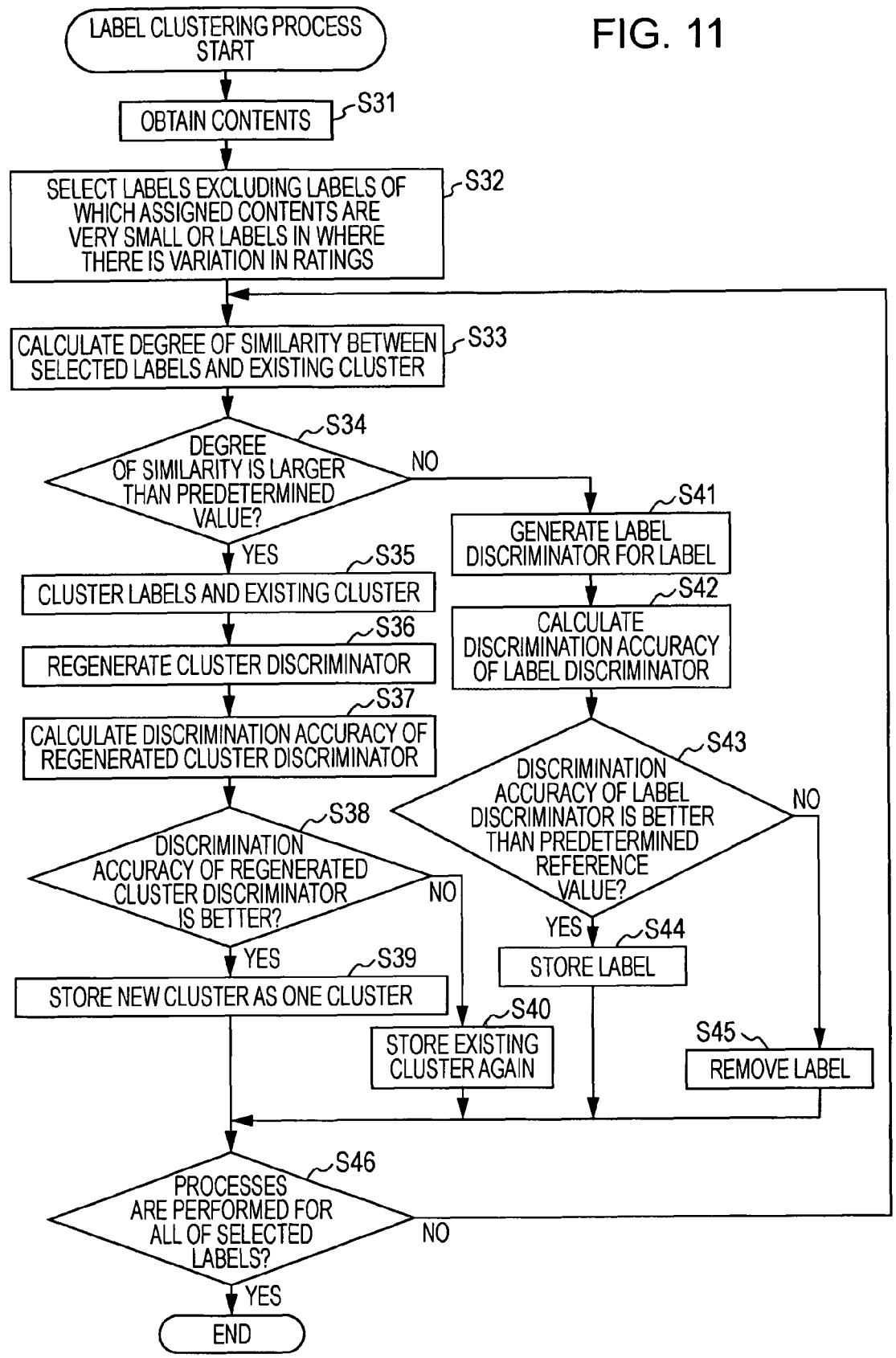
FIG. 11 is a flowchart illustrating another example of the label clustering process.

Here, a label clustering process in a case where labels are additionally given from a state where a relatively sufficient number of clusters are accumulated will be described with reference to a flowchart in FIG. 11.

In step S31, the content obtaining unit 71 obtains a predetermined amount of contents from a large amount of contents accumulated in the content DB 53, the terminal 3 on the network 1, or other servers or the like.

In step S32, the label selection unit 72 selects labels, excluding labels for which the assigned contents are very small or labels for which there is variation in the ratings by volunteers, from the labels assigned to the contents obtained by the content obtaining unit 71, and supplies the selected labels to the similarity calculation unit 73.

In step S33, the similarity calculation unit 73 obtains the cluster (hereinafter, referred to as the existing cluster) accumulated in the label DB 77 and calculates a degree of similarity between the labels supplied from the label selection unit 72 and the existing cluster. The existing cluster may include clustered plural labels or a clustered single label.

In step S34, the similarity calculation unit 73 determines whether or not the maximum degree of similarity among the degrees of similarity calculated in step S33 is greater than a predetermined value.

Here, the predetermined value may be a value set in advance or may be the minimum value or an average value of degrees of similarity calculated regarding clusters (clusters stored in step S19 in the flowchart in FIG. 10) obtained by collectively clustering labels.

In step S34, when the maximum degree of similarity is determined to be greater than the predetermined value, the similarity calculation unit 73 supplies the labels and the existing cluster which cause the maximum degree of similarity to be calculated to the clustering unit 74, and the flow goes to step S35.

In step S35, the clustering unit 74 obtains a cluster (hereinafter, referred to as a new cluster) by clustering labels and the existing cluster with respect to the labels and the existing cluster from the similarity calculation unit 73, and supplies the new cluster and the existing cluster to the discriminator generation unit 75.

In step S36, the discriminator generation unit 75 obtains from the content obtaining unit 71 feature values of a content which is assigned with the labels included in the new cluster and the labels included in the existing cluster, supplied from the clustering unit 74, and generates (regenerates) a cluster discriminator for the new cluster based on the feature values.

In step S37, the accuracy calculation unit 76 calculates a discrimination accuracy of the regenerated cluster discriminator from the discriminator generation unit 75. In addition, the accuracy calculation unit 76 compares the calculated discrimination accuracy of the regenerated cluster discriminator with the discrimination accuracy of the cluster discriminator (which is stored in a storage unit (not shown)) before being regenerated.

In step S38, the accuracy calculation unit 76 determines whether or not the discrimination accuracy of the regenerated cluster discriminator is better as a result of the comparison of the discrimination accuracy of the regenerated cluster discriminator with the discrimination accuracy of the cluster discriminator before being regenerated.

Here, as a result of the comparison of the discrimination accuracy, the accuracy calculation unit 76 may simply determine whether or not the discrimination accuracy of the regenerated cluster discriminator is better, or may determine whether or not a value of the discrimination accuracy of the regenerated cluster discriminator is greater than a value of the discrimination accuracy of the cluster discriminator before being regenerated, for example, greater than a constant value such as 15% or more of the value of the discrimination accuracy of the cluster discriminator before being regenerated.

Also, for example, the accuracy calculation unit 76 may compare the discrimination accuracy of the regenerated cluster discriminator with discrimination accuracies of all the cluster discriminators stored in the storage unit (not shown) and may determine whether or not the discrimination accuracy of the regenerated cluster discriminator is better than the discrimination accuracies of all the cluster discriminators stored in the storage unit (not shown), or the like.

In other words, in step S38, it is determined that the average discrimination accuracy of all the finally stored cluster discriminators does not become worse.

When the discrimination accuracy of the regenerated cluster discriminator is determined to be better in step S38, the flow goes to step S39, where the accuracy calculation unit 76 supplies the new cluster to the label DB 77 as one label so as to be stored. Thereafter, the flow goes to step S46.

On the other hand, when the discrimination accuracy of the regenerated cluster discriminator is determined not to be better in step S38, that is, when the average discrimination accuracy of all the stored cluster discriminators seems to become worse, the flow goes to step S40, where the accuracy calculation unit 76 supplies the existing cluster to the label DB 77 as one label so as to be stored again. After step S40, the flow goes to step S46. Here, the labels included in the existing cluster in step S35 may be removed, and processes from step S41 described later may be performed.

When the maximum degree of similarity is determined not to be greater than the predetermined value in step S34, the similarity calculation unit 73 supplies only the labels of the labels and the existing cluster which cause the maximum degree of similarity to be calculated, to the discriminator generation unit 75 via the clustering unit 74. At this time, the clustering unit 74 performs no process for the labels from the similarity calculation unit 73 and supplies the labels to the discriminator generation unit 75.

In step S41, the discriminator generation unit 75 obtains from the content obtaining unit 71 feature values of the content assigned with the label from the similarity calculation unit 73, generates a label discriminator for the label based on the feature values, and supplies the generated label discriminator to the accuracy calculation unit 76.

In step S42, the accuracy calculation unit 76 calculates a discrimination accuracy of the label discriminator from the discriminator generation unit 75 and compares the calculated discrimination accuracy with a predetermined reference value.

Here, the predetermined reference value may be a value set in advance, for example, may be a minimum value or the like of discrimination accuracies of cluster discriminator and label discriminators for the cluster and the labels accumulated in the label DB 77.

In step S43, the accuracy calculation unit 76 determines whether or not the discrimination accuracy of the label discriminator is better as a result of the comparison of the discrimination accuracy of the label discriminator with the predetermined reference value.

When the discrimination accuracy of the label discriminator is determined to be better in step S43, the flow goes to step S44, where the accuracy calculation unit 76 supplies the label of the label discriminator to the label DB 77 so as to be stored, and then the flow goes to step S46.

On the other hand, when the discrimination accuracy of the label discriminator is determined not to be better in step S43, the flow goes to step S45, where the accuracy calculation unit 76 removes the label of the label discriminator. Thereafter, the flow goes to step S46.

In step S46, the similarity calculation unit 73 determines whether or not the processes from step S34 are performed for all the labels supplied from the label selection unit 72.

When it is determined that the processes are not performed for all the labels in step S46, the flow returns to step S33, and the processes are repeatedly performed from step S33 until the processes are performed for all the labels.

An existing cluster obtained from the label DB 77 in step S33 from the second clustering process includes the new cluster stored in step S39, the existing cluster secondly stored in step S40, and one label stored in step S44.

On the other hand, when it is determined that the processes are performed for all the labels in step S46, the label clustering process is finished.

By the above-described process, labels of different languages are grouped based on a degree of similarity between labels and an existing cluster. Thereby, for example, when a user assigns a label to a given content as evaluation of the content in a country using a language which the user does not completely understand, a label of the country corresponding to the label of the user's own language may be easily selected. Therefore, it is possible to accurately assign sensibility information to given contents of different countries or cultures.

Also, the added label is included in the existing cluster or removed according to a degree of similarity between the label and the existing cluster regardless of languages, and thus it is not necessary to prepare labels through evaluation of a presence or not of a similar label or to prepare a label of each language in advance, and it is possible to prepare labels without taking time and effort.

Also, when the number of labels selected in step S32 is larger than a certain number, or, for example, an average value of degrees of similarity calculated in step S33 is smaller than a certain value, the processes from step S13 in the flowchart in FIG. 10 may be performed. Thereby, when most of the selected labels are not included in the existing cluster, the labels may be newly collectively clustered.

In the clustering process described with reference to the flowchart in FIG. 11, the discriminator is generated for the new cluster having the greatest degree of similarity between the selected one label and the existing cluster, and the new cluster is treated as one label according to the discrimination accuracy of the discriminator. However, in the clustering process in FIG. 11, for example, for each of plural existing clusters where degrees of similarity between the plural existing clusters and one label are greater than a predetermined value, a new cluster including the label may be obtained, and a new cluster of a discriminator having the best discrimination accuracy, of discriminators generated for the respective new clusters, may be treated as one label.

There has been described above the label clustering process where labels of different languages are grouped based on human sensibility regardless of countries or cultures. A process where the labels clustered as described above are assigned to a content will be described below.

Example of Label Assigning Process

Figure 12:
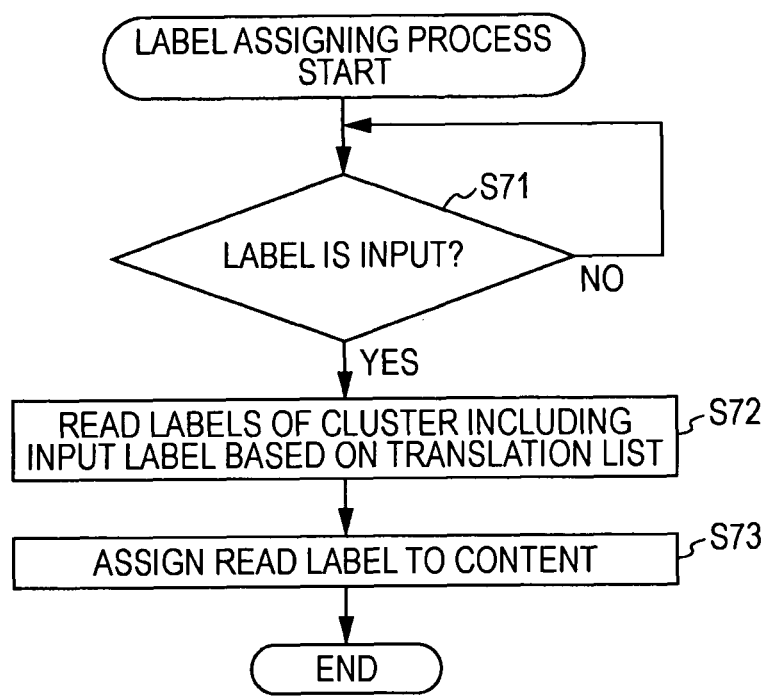
FIG. 12 is a flowchart illustrating a label assigning process.

Here, a label assigning process in the server 2 will be described with reference to FIG. 12. A content accumulated in the content DB 53 is read by a user via the terminal 3, a command indicating that labels are assigned to the content is input, and thereafter the label assigning process is performed if the content is read by the label assignment unit 52.

In step S71, the label assignment unit 52 determines whether or not a label for assigning to a content is input by a user via the terminal 3.

When it is determined that a label is not input in step S71, the process in step S71 is repeated until a label is input.

On the other hand, when it is determined that a label is input in step S71, the flow goes to step S72.

In step S72, the label assignment unit 52 refers to the translation list 77a stored in the label DB 77 of the label management unit 51, and reads from the label DB 77 a label of a language corresponding to a presented country or culture, from the labels included in a cluster including the input label.

For example, when Japanese "shiawase" is input as the label in an English-speaking country employing English as a language, the translation list 77a shown in FIG. 9 is referred to, and English "mellow" correlated with Japanese "shiawase" as a label included in Cluster 3 is read from the label DB 77.

In step S73, the label assignment unit 52 assigns the label read in step S72 to the content read from the content DB 53.

At this time, the label assignment unit 52 supplies the content assigned with the label to the presentation unit 54. The presentation unit 54 supplies (transmits) a name of the content assigned with the label to the terminal 3 along with the label assigned to the content. The terminal 3 displays that a label corresponding to the label input by the user is assigned to the content read by the user.

By the above-described process, labels of different languages which are grouped based on human sensibility are assigned to a content regardless of country or culture. For example, when a user assigns a label to a given content as evaluation of the content in a country using a language which the user does not completely understand, a label of the country corresponding to the label of the user's own language is assigned. That is to say, it is possible to accurately assign sensibility information to given contents of different countries or cultures.

In addition, in the above description of the embodiments, the label clustering process or the label assigning process is performed in the server 2 side. The type where the process is performed in the server 2 side is suitable for, for example, a case or the like where a content is supplied to the terminal 3 via the network 1.

However, this does not mean that the label clustering process or the label assigning process described above is performed only in the server 2 side. For example, the label clustering process may be performed in the server 2 side, and the label assigning process may be performed in the terminal 3 using the result thereof. Furthermore, the label clustering process or the label assigning process may be performed in the terminal 3.

Recording Medium

The above-described series of processes may be performed by hardware or software. When a series of processes is performed by the software, programs constituting the software are installed from a program recording medium to a computer embedding dedicated hardware therein, or, for example, a general personal computer which can execute various kinds of functions by installing various kinds of programs.

Program recording media recording programs which can be installed in a computer and be executed by the computer, include, as shown in FIG. 2, magnetic discs (including flexible discs), optical discs (including CD-ROM (Compact Disc-Read Only Memory) and DVD (Digital Versatile Disc)), magnetic optical discs (including MD (Mini-Disc)), or the removable media 31 which are package media constituted by semiconductor memories or the like, or hard discs constituting the ROM 22 or the storage unit 28 which stores programs temporarily or permanently. Programs are optionally recorded in the program recording media using a wired or wireless communication media such as the network 1 including the Internet or a LAN, or digital satellite broadcasting, via the communication unit 29 which is an interface such as a router or a modem.

Also, in this specification, the steps for describing programs recorded in a recording medium include not only processes performed in a time series according to the described order, but also processes performed in parallel or separately even if not necessarily performed in the time series.

In this specification, the system indicates the entire device configured by a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising a processor to implement:
    an obtaining means that obtains a plurality of contents to which labels indicating users' subjective evaluation of the contents are assigned as metadata;
    a selection means that selects labels having a high reliability in regards to evaluation of the contents among the labels assigned to the plurality of contents obtained by the obtaining means;
    a calculation means that calculates a degree of similarity between the labels selected by the selection means;
    a clustering means that clusters the labels based on the degree of similarity calculated by the calculation means;
    a storage means that stores a cluster obtained as a result of the clustering in the clustering means, as one label; and
    a generation means that generates:
    a cluster discriminator which is a discriminator used to discriminate relevance to the cluster of the contents based on feature values of the contents assigned with the labels which are clustered by the clustering means; and
    a label discriminator which is a discriminator used to discriminate relevance to the clustered labels of the contents,
    wherein the storage means stores the cluster as one label when a discrimination accuracy of the cluster discriminator is better than a discrimination accuracy of the label discriminator,
    each feature value being associated with a plurality of classes, the plurality of classes being determined by analysis of physical properties for a plurality of the contents, and for each label, each feature value being set to one of the plurality of classes, and
    wherein the labels include labels in a plurality of respective languages, and the labels of different languages are clustered together based on the feature values such that a cluster includes labels of different languages.

2. The information processing device according to claim 1, wherein the calculation means calculates a degree of similarity between the labels selected by the selection means and an existing cluster obtained in advance by the clustering means, and
    wherein the clustering means causes the labels to be included in the existing cluster based on the degree of similarity.

3. The information processing means according to claim 2, wherein the generation means generates a new cluster discriminator which is a discriminator regarding a new cluster obtained by causing the labels to be included in the existing cluster, and
    wherein the storage means stores the new cluster as one label when a discrimination accuracy of the new cluster discriminator is better than a discrimination accuracy of the cluster discriminator regarding the existing cluster.

4. The information processing device according to claim 1, further comprising an assigning means that, when the labels input used to evaluate contents are included in a cluster which is obtained as a result of the clustering in the clustering means, assigns labels other than the input labels included in the cluster to the contents.

5. An information processing method comprising the steps of using a processor for:
    obtaining a plurality of contents to which labels indicating users' subjective evaluation of the contents are assigned as metadata;
    selecting labels having a high reliability in regards to evaluation of the contents among the labels assigned to the plurality of contents obtained at the obtaining step;
    calculating a degree of similarity between the labels selected at the selection step;
    clustering the labels based on the degree of similarity calculated at the calculation step;
    storing a cluster obtained as a result of the clustering at the clustering step, as one label;
    using a cluster discriminator to discriminate relevance to the cluster of the contents based on feature values of the contents assigned with the labels which are clustered by the clustering means; and
    using a label discriminator to discriminate relevance to the clustered labels of the contents,
    wherein the step of storing comprises storing the cluster as one label when a discrimination accuracy of the cluster discriminator is better than a discrimination accuracy of the label discriminator,
    each feature value being associated with a plurality of classes, the plurality of classes being determined by analysis of physical properties for a plurality of the contents, and for each label, each feature value being set to one of the plurality of classes, and
    wherein the labels include labels in a plurality of respective languages, and the labels of different languages are clustered together based on the feature values such that a cluster includes labels of different languages.

6. A non-transitory computer-readable medium having stored thereon a computer-readable program enabling a computer to perform the steps of:
    obtaining a plurality of contents to which labels indicating users' subjective evaluation of the contents are assigned as metadata;
    selecting labels having a high reliability in regards to evaluation of the contents among the labels assigned to the plurality of contents obtained at the obtaining step;
    calculating a degree of similarity between the labels selected at the selection step;
    clustering the labels based on the degree of similarity calculated at the calculation step;
    storing a cluster obtained as a result of the clustering at the clustering step, as one label;
    using a cluster discriminator to discriminate relevance to the cluster of the contents based on feature values of the contents assigned with the labels which are clustered by the clustering means; and
    using a label discriminator to discriminate relevance to the clustered labels of the contents,
    wherein the step of storing comprises storing the cluster as one label when a discrimination accuracy of the cluster discriminator is better than a discrimination accuracy of the label discriminator,
    each feature value being associated with a plurality of classes, the plurality of classes being determined by analysis of physical properties for a plurality of the contents, and for each label, each feature value being set to one of the plurality of classes, and
    wherein the labels include labels in a plurality of respective languages, and the labels of different languages are clustered together based on the feature values such that a cluster includes labels of different languages.

7. An information processing device comprising using a processor to implement:
    an obtaining unit that obtains a plurality of contents to which labels indicating users' subjective evaluation of the contents are assigned as metadata;
    a selection unit that selects labels having a high reliability in regards to evaluation of the contents among the labels assigned to the plurality of contents obtained by the obtaining unit;
    a calculation unit that calculates a degree of similarity between the labels selected by the selection unit;
    a clustering unit that clusters the labels based on the degree of similarity calculated by the calculation unit;
    a storage unit that stores a cluster obtained as a result of the clustering in the clustering unit, as one label; and
    a generation unit that generates:
    a cluster discriminator which is a discriminator used to discriminate relevance to the cluster of the contents based on feature values of the contents assigned with the labels which are clustered by the clustering means; and
    a label discriminator which is a discriminator used to discriminate relevance to the clustered labels of the contents,
    wherein the storage means stores the cluster as one label when a discrimination accuracy of the cluster discriminator is better than a discrimination accuracy of the label discriminator,
    each feature value being associated with a plurality of classes, the plurality of classes being determined by analysis of physical properties for a plurality of the contents, and for each label, each feature value being set to one of the plurality of classes, and
    wherein the labels include labels in a plurality of respective languages, and the labels of different languages are clustered together based on the feature values such that a cluster includes labels of different languages.

* * * * *